(12) United States Patent
Sens et al.

(10) Patent No.: US 10,759,022 B2
(45) Date of Patent: Sep. 1, 2020

(54) METHOD OF PRODUCING THERMALLY PROTECTED COMPOSITE

(71) Applicant: CARBON REVOLUTION LIMITED, Waurn Ponds (AU)

(72) Inventors: Stefen Sens, Waurn Ponds (AU); Eden Kwok, Newton (AU); Michael Dunbar Silcock, Caulfield North (AU); Aaron Brighton, Bells Beach (AU); Ashley James Denmead, Belmont (AU); Nathan Jones, Waurn Ponds (AU); Hugo Howse, Altona (AU)

(73) Assignee: Carbon Revolution Limited, Waurn Ponds, Victoria (AU)

( * ) Notice: Subject to any disclaimer, the term of this patent is extended or adjusted under 35 U.S.C. 154(b) by 201 days.

(21) Appl. No.: 15/568,666

(22) PCT Filed: Apr. 22, 2016

(86) PCT No.: PCT/AU2016/050294
§ 371 (c)(1),
(2) Date: Oct. 23, 2017

(87) PCT Pub. No.: WO2016/168899
PCT Pub. Date: Oct. 27, 2016

(65) Prior Publication Data
US 2018/0147695 A1    May 31, 2018

(30) Foreign Application Priority Data

Apr. 24, 2015 (AU) ............................ 2015901471

(51) Int. Cl.
*B24C 1/04* (2006.01)
*B60B 5/02* (2006.01)
(Continued)

(52) U.S. Cl.
CPC .................. *B24C 1/04* (2013.01); *B24C 1/06* (2013.01); *B24C 3/32* (2013.01); *B24C 11/00* (2013.01);
(Continued)

(58) Field of Classification Search
CPC .. B24C 1/04; C23C 4/134; C23C 4/02; C23C 4/08; C23C 4/10; C23C 4/18;
(Continued)

(56) References Cited

U.S. PATENT DOCUMENTS 4,017,348 A * 4/1977 Shumaker ................ B60B 5/02
156/189
4,376,749 A * 3/1983 Woelfel ................... B29C 70/00
264/258

(Continued)

FOREIGN PATENT DOCUMENTS

AU    2009290123    3/2010
AU    2012261644    1/2013
(Continued)

OTHER PUBLICATIONS

"Notification of Transmittal of the International Search Report and the Written Opinion of the International Searching Authority, or the Declaration," International Filing Date: Apr. 22, 2016, International Application No. PCT/AU2016/050294, Applicant: Carbon Revolution Pty Ltd., dated Jun. 7, 2016, pp. 1-10.

*Primary Examiner* — Kip T Kotter
(74) *Attorney, Agent, or Firm* — Cesari and McKenna, LLP

(57) ABSTRACT

A method of producing a composite component (10) having a thermal protection layer (24) including the steps of: providing a composite component (10) with a primary fibre material (12) and with a primer layer (16) of alternative fibre material overlying the primary fibre material (12) at an area
(Continued)

of the composite component intended for high thermal exposure, said area defining a thermal exposure area (18); applying a metallic bonding layer (22) to the primer layer (16) of the thermal exposure area (18) to create a bonding surface at the thermal exposure area (18); and applying a ceramic thermal protection layer (24) to the bonding surface for insulating the thermal exposure area (18) and/or for reflecting external thermal energy, the thermal protection layer (24) having a higher melting point than the metallic bonding layer (22).

26 Claims, 4 Drawing Sheets

(51) Int. Cl.
| | | |
|---|---|---|
| *B60R 13/08* | (2006.01) | |
| *B24C 1/06* | (2006.01) | |
| *B24C 3/32* | (2006.01) | |
| *B24C 11/00* | (2006.01) | |
| *C23C 4/02* | (2006.01) | |
| *C23C 4/18* | (2006.01) | |
| *C23C 4/08* | (2016.01) | |
| *C23C 4/10* | (2016.01) | |
| *C23C 4/134* | (2016.01) | |
| *C23C 28/00* | (2006.01) | |
| *B29C 70/88* | (2006.01) | |
| *B32B 5/26* | (2006.01) | |
| *B32B 7/12* | (2006.01) | |
| *B32B 1/00* | (2006.01) | |

(52) U.S. Cl.
CPC ............ *B60B 5/02* (2013.01); *B60R 13/0869* (2013.01); *C23C 4/02* (2013.01); *C23C 4/08* (2013.01); *C23C 4/10* (2013.01); *C23C 4/134* (2016.01); *C23C 4/18* (2013.01); *C23C 28/00* (2013.01); *C23C 28/322* (2013.01); *C23C 28/34* (2013.01); *C23C 28/3455* (2013.01); *B29C 70/885* (2013.01); *B32B 1/00* (2013.01); *B32B 5/26* (2013.01); *B32B 7/12* (2013.01); *B32B 2250/44* (2013.01); *B32B 2255/02* (2013.01); *B32B 2255/20* (2013.01); *B32B 2255/205* (2013.01); *B32B 2255/28* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2262/14* (2013.01); *B32B 2307/206* (2013.01); *B32B 2307/304* (2013.01); *B32B 2307/306* (2013.01); *B32B 2307/546* (2013.01); *B32B 2605/08* (2013.01)

(58) Field of Classification Search
CPC ....... C23C 28/00; C23C 28/322; C23C 28/34; C23C 28/3455; B60B 5/02; B60R 13/0869
See application file for complete search history.

(56) References Cited

U.S. PATENT DOCUMENTS

| | | | |
|---|---|---|---|
| 5,188,981 A | 2/1993 | Stiles et al. | |
| 5,305,726 A | 4/1994 | Scharman et al. | |
| 5,538,114 A * | 7/1996 | White | F16D 65/10 188/218 R |
| 5,792,521 A | 8/1998 | Wortman | |
| 10,495,166 B2 * | 12/2019 | Renner | B60B 7/0093 |
| 2005/0202237 A1 | 9/2005 | Fryberger et al. | |
| 2006/0013962 A1* | 1/2006 | Fuller | C23C 24/04 427/446 |
| 2010/0304063 A1* | 12/2010 | McCrea | C08J 7/04 428/35.8 |
| 2011/0039086 A1* | 2/2011 | Graham | A61L 27/04 428/220 |
| 2014/0049096 A1* | 2/2014 | Hess | B60B 30/08 301/95.101 |
| 2014/0072799 A1* | 3/2014 | Prentice | A63B 53/04 428/339 |
| 2015/0086795 A1* | 3/2015 | Giddings | C23C 4/06 428/446 |

FOREIGN PATENT DOCUMENTS

| | | | | |
|---|---|---|---|---|
| AU | 2014311253 | | 3/2015 | |
| EP | 2853566 A1 | | 4/2015 | |
| EP | 3272557 A1 * | | 1/2018 | ............ B60B 21/12 |
| JP | 06092101 A * | | 4/1994 | |
| JP | 07-151135 A | | 6/1995 | |
| WO | WO2014082115 | | 6/2014 | |
| WO | WO2014089598 | | 6/2014 | |
| WO | WO2014165895 | | 10/2014 | |

* cited by examiner

METHOD OF PRODUCING THERMALLY PROTECTED COMPOSITE

CROSS-REFERENCE

The present application is the National Stage of International Application No. PCT/AU2016/050294, filed on 22 Apr. 2016, which claims priority from Australian provisional patent application No. 2015901471 filed on 24 Apr. 2015, the disclosure of both of which should be understood to be incorporated into this specification.

TECHNICAL FIELD

The present invention generally relates to a method of producing a thermally protected composite material, in particular a composite component intended for exposure to high radiant or convective temperatures. While the invention is especially applicable for automotive composite components, particularly composite wheel arrangements, it is to be appreciated that the invention is not necessarily limited to that application.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

High performance composite components can be limited in their application due to softening of the polymer matrix in the composite material when exposed to high levels of thermal energy. In this regard, applications which cause a composite component to be heated outside of its service temperature can result in reduced mechanical performance of the component when placed under mechanical load. One such example application in which an external heat source is applied to a composite component is that of a composite automotive component, for example a wheel, being exposed to the radiant or convective thermal energy from an adjacent brake calliper and rotor assembly during the braking process.

For this reason it is generally necessary to shield composite components from external heat sources (whether radiant, conductive or convective) which could raise the temperature of the composite component above the glass transition temperature Tg at which the integrity and/or performance of the matrix material within the composite can become compromised.

Previous attempts to address this issue have included the development of higher Tg resins providing a composite matrix with greater heat resistance. However this approach increases overall composite cost and, moreover, there are many applications for which there is no suitable resin having the required service temperature.

Alternative previous systems have utilised a metallic heat shield spaced apart from the composite surface to provide an air gap or buffer between the heat source and the composite surface. However it will be appreciated that this solution is cumbersome and undesirably necessitates additional space to be provided surrounding the composite component.

In other prior systems, metallic or ceramic protective coatings have been adhesively bonded to the composite surfaces, some coatings being integrally formed with grid structures to limit contact with the composite surface thereby reducing the thermal conductivity between the protective coating and the composite surface. In yet another system, a number of protective coatings is applied to the composite surface by means of thermal spraying. These thermal protection systems rely on the adhesion between the protective coating/shield and to the composite surface. However the interface between the carbon fibre composite surface and the various prior bonding coats (generally metallic) has traditionally provided for poor chemical and mechanical bonding. As such, the delamination of thermal protection coatings is a persistent issue in the field of composite materials including for the above-noted prior systems.

It is therefore desirable to provide an alternative and/or improved method of producing a thermally protected composite component.

SUMMARY OF INVENTION

According to a first aspect of the present invention there is provided a method of producing a composite component having a thermal protection layer including the steps of:
  providing a composite component with a primary fibre material and with a primer layer of alternative fibre material overlying the primary fibre material at an area of the composite component intended for high thermal exposure, said area defining a thermal exposure area;
  applying a metallic bonding layer to the primer layer of the thermal exposure area to create a bonding surface at the thermal exposure area; and
  applying a ceramic thermal protection layer to the bonding surface for insulating the thermal exposure area and/or for reflecting external thermal energy, the thermal protection layer having a higher melting point than the metallic bonding layer.

The present invention therefore provides a layer of primer material integrated into the composite component to form an interlayer between the primary fibre material of the composite material (typically carbon fibre) and the bonding layer. The provision of this interlayer provides an improved adhesion point for the bonding layer which advantageously addresses the issue of protection-coat delamination as compared to prior systems where bonding coats have been applied directly to the primary fibre material of composite components. The present invention therefore provides a more chemically and mechanically compatible adhesion surface for the various protection layers subsequently applied thereto, reducing the risk of delamination and improving the performance parameters of the composite component.

As well as providing improved engagement between the metallic bonding layer and the composite surface, the present invention is advantageous in that the primer layer is incorporated into the composite component. The composite component is preferably provided using conventional moulding and curing processes however alternative composite component manufacturing techniques may be used to provide the composite component. In instances where the composite component is provided by moulding, the primer layer is therefore integrally provided within the resin of the composite component. This provides a significant advantage over, for example, adhering a primer layer to a cured composite surface in which case there may exist a risk of delamination between the primer layer and the composite surface.

The above-noted adhesion improvements have been quantified with adhesion testing conducted in accordance with ASTM D4541: 'Standard Test Method for Pull-Off Strength of Coatings Using Portable Adhesion Testers'. As will be discussed in further detail with reference to the examples below, the Applicant has observed a 20-50% increase in adhesion strength when a primer layer is provided in the composite component, in accordance with the present invention, as compared to equivalent tests where a primer layer was not used.

The use of a primer layer to provide increased adhesion in the manner of the present invention is not known or taught by existing heat-protection processes and, in particular, is not known or taught by existing heat-protection processes associated with composite components. In this regard, the present invention represents a significant improvement in the field of composite materials which is not anticipated or suggested by the prior art.

In particular applications, the thermal exposure area may constitute a relatively small portion of the whole composite component in which case the primer layer may be a localised 'patch' on the primary fibre material. In alternative applications in which most or all of the component is intended for exposure to high thermal energy the thermal exposure area may constitute most or all of the composite surface area and therefore the primer material may provide an outer layer overlying most or all of the primary fibre material. In a particular embodiment of the invention in which the present invention is used to provide a thermally protected composite wheel, the thermal exposure area may comprise a collection of surfaces inside the wheel which, in use, are exposed to radiant and convective heat emitted from a vehicle brake assembly. By way of example, the thermal exposure area may include an inner surface of the wheel rim, an inner surface on the wheel spokes and an inner surface on the wheel hub.

The primer layer also provides the additional advantage of electrically insulating the metallic bonding layer from the primary, typically carbon, fibres therefore reducing or even eliminating the potential for galvanic corrosion of the metallic bonding layer.

The metallic bonding layer and ceramic thermal protection layer can comprise coatings applied by spraying, for example thermal spraying such as plasma spraying, or can be applied by alternative techniques such as dipping, painting or vapour deposition.

It will be appreciated that, before application of the bonding layer, the primer layer will form an outer layer of the composite component at the thermal exposure area. Upon application of the bonding layer to the primer layer, the primer layer thereupon forms an interlayer between the primary fibre layer and the bonding layer. Following the application of the thermal protection layer to the bonding layer, the primer layer and the bonding layer will therefore form a pair of intermediate layers between the primary fibre layer and the outer thermal protection layer.

The primary fibre material can be formed from a variety of fibre types such as carbon fibre, aramid fibre, glass fibre or the like and could also be formed from mixtures of different fibre materials. The primer layer is formed from an alternative fibre material to the primary fibre material. The purpose of providing a primer layer with alternative material to the material of the composite component is to facilitate adhesion between the primary fibre material and the thermal protection layer. In some forms of the invention, the primer layer of alternative fibre material is a ceramic fibre material. In a particular form of the invention the thermal protection layer is a metallic thermal protection layer and the primer layer is a glass fibre layer which, advantageously, has been found to have significantly improved bonding compatibility with the metallic material of the bonding layer when compared to carbon fibre. In some forms of the invention the fibres of the primer layer material may be formed by alumina oxide whereas, in alternative forms the primer fibres may be formed by silicon oxide. In still further forms, the primer layer is formed from a combination of alumina oxide and silicon oxide. Of course it will be appreciated that a variety of ceramic materials or glass fibres may be suitable for this application.

In some embodiments of the invention, the alternative fibre layer may comprise a material having alternative fibres to the fibres of the primary material for example a glass fibre primer layer on a carbon fibre primary material. In alternative forms of the invention, the alternative fibre material may include the same fibre material as the primary fibre material but with additional materials added to facilitate bonding between the primer layer and the thermal protection layer. By way of example, in a particular embodiment of the present invention the primary fibre material is carbon fibre and the primer layer of alternative fibre material is a mix of carbon fibre and metallic fibres/strands. In this embodiment, the metallic strands within the primer layer improve adhesion between the primer layer and the metallic thermal protection layer, fulfilling the same function as the glass fibres in the alternative embodiment discussed above. In this regard, the term 'alternative fibre material' will be appreciated as referring to a fibre-based material that is alternative to the fibre-based material used in the composite component but not necessarily a fibre-base material formed from alternative fibres.

A particular composition of the primer layer can include a 110 g/m$^2$ plain weave glass mat. The fibres used to form the glass mat can be E-Glass fibres of continuous filament having 7 micron diameter and a yarn of 22 (22 grams per 1000 m). As will be appreciated by a person skilled in the art, E-Glass fibres typically comprise 52%-56% silicon dioxide, 16%-25% calcium oxide, 12% 16% aluminium oxide, 8%-13% boron oxide, 0%-1% sodium & potassium oxide and 0% to 6% magnesium oxide. Of course, it will be appreciated that a variety of composite materials may be used in the primer layer. By way of example, alternate primer layers may include a 107 g/m$^2$ plain weave E-glass mat or, alternatively, a 2 layer glass mat formed of 65 g/m$^2$ glass material.

As noted above, the primer layer may also include metallic strands or particles to facilitate adhesion between the primer layer and the metallic bonding layer. In these forms, the metallic strands could be distributed in a particular concentration throughout the fibres of the primer layer for contacting the particles of the bonding layer and thereby enhancing adhesion when the metallic bonding material contacts similarly metallic strands within the primer layer. In a particular form of the invention the metallic strands or particles are formed from at least one of copper, aluminium, titanium, steel or alloys thereof. Again, it will be appreciated that a variety of suitable metallic materials may be appropriate for this application and can be selected, as necessary, based on the adhesion compatibility of the particular materials. As noted above, the inclusion of metallic strands or particles in the material of the primer layer can improve adhesion between the primer layer and subsequent metallic layers such that the primer layer can be formed using the same fibre material as used in the primary fibre layer. That is, the fibres of the primer layer material need not necessarily be fibres which facilitate bonding to subsequent metallic layers (for example glass) as this function is performed by the metallic strands/particles present within the primer layer. Accordingly, a primer layer overlying a carbon fibre composite could comprise a carbon fibre material mixed with metallic strands.

The fibres of the primer layer may be woven such that the primer layer itself forms a woven fibre structure. This form of the invention may be advantageous in the manufacture process insofar as allowing pre-woven primer layers to be conveniently stored in rolls for transportation and storage. Moreover, there may be applications in which the woven structure provides desirable mechanical properties (for example stiffness) thereby enhancing the mechanical properties provided by the primary fibre layer. In alternative forms of the invention, the primer layer may be formed by randomly orientated fibres. In some forms, the primer layer may comprise a fibre mat or sheet weighing at least 50 g/m$^2$.

The invention can include the additional step of preparing the surface of the thermal exposure area with a surface treatment to expose at least a portion of the primer layer, prior to application of the metallic bonding layer. In applying the surface treatment, at least part of the outer resin impregnating the primer layer is removed to expose at least a portion of the primer layer fibres to facilitate connection between the primer layer and the bonding layer.

In some forms of the invention the surface treatment comprises grit blasting the thermal exposure area. In a particular form of the invention, the grit blasting comprises grit blasting using alumina grit which, depending on the type of grit blaster that is used, is accelerated using an air or water stream. In this way, the abrasive grit particles can erode the outer resin surface of the thermal exposure area and expose the fibres of the primer layer ready for application and adhesion of the bonding layer to the abraded primer layer. It will be appreciated that the surface treatment will therefore increase the surface roughness of thermal exposure area to, again, improve adhesion of the bonding layer to the primer layer. In particular forms of the invention, the surface treatment is applied to obtain an RA roughness of 4 to 7 micrometres. To do so, some forms of the invention may utilise medium/fine alumina grit in the range of #90 to #46 mesh and applied at relatively moderate pressure (20 to 40 psi). It will be appreciated that the roughness of the composite surface to which the bonding layer is applied is a key factor in achieving the desirable level of adhesion. For this reason, the variables of the grit blaster may be adjusted or optimised, for example, to utilise coarser or finer grit formed from different materials and sprayed at different pressures in order to achieve the desired roughness parameters and to minimise or eliminate deleterious entrapment of the abrading alumina particle in the substrate. In a particular embodiment, the primer layer has a roughness equal or greater to RA 4 (i.e. no rougher than RA 7) to ensure the mechanical integrity of primer layer is not compromised due to over-erosion.

In some forms of the invention, a roughened or abraded primer layer surface may be achieved by a surface treatment other than grit blasting. In one such example, the composite component may be moulded with a peeling layer overlying the primer layer. After moulding, the peeling layer can be peeled from the primer layer to reveal a roughened surface underneath. In this manner the primer layer is provided with a rough surface improving adhesion with the subsequent bonding layer.

Turning now to the application of the metallic bonding layer, in particular forms of the invention, the bonding layer may be thermally sprayed to the abraded primer layer. The appropriate type of thermal spraying will be determined on the basis of the particular materials and application but may include any one of twin-wire arc spraying, flame spraying or plasma spraying. The bonding layer can thus provide a bonding surface to which the thermal protection layer may be applied and bonded thereto. In certain forms of the invention, the metallic bonding layer may be applied to have a thickness of between 64 to 120 microns. Preferably, the metallic bonding layer has a thickness of between 64 to 111 microns. The metallic bonding layer can be formed from a variety of metallic materials, for example, aluminium, zinc, copper, nickel or an alloy or mixture thereof. According to a particular form of the invention, the bonding layer is formed from aluminium.

In a particular form of the invention the metallic bonding layer has a thickness of between 80 to 100 microns. In a particular embodiment, the metallic bonding layer has a thickness of approximately 90 microns. In an alternative embodiment of the invention, the metallic bonding layer has a thickness of between 70 to 80 microns and, in particular, may have a thickness of approximately 70 microns.

The thermal protection layer is formed from a ceramic material which provides the desired inherent thermal resistance. In some forms of the invention the thermal protection layer is applied until a desired thickness is achieved. Preferably, the thermal protection layer has a thickness of 86 to 149 microns. A particular embodiment of the invention includes a thermal protection layer thickness of between 90 to 110 microns. According to one embodiment of the invention the thickness of the thermal protection layer is approximately 100 microns. According to an alternative embodiment of the invention the thickness of the thermal protection layer is between 100 to 140 microns and, in particular, a thickness of approximately 120 microns.

In a particular embodiment of the invention, the thermal protection layer is thermally sprayed to the metallic bonding layer using plasma spraying. To further reduce thermal conductivity, the ceramic material of the thermal protection layer may have relatively high porosity and, in some forms of the invention, the thermal protection layer may have a porosity of between 10% to 15%.

For certain applications, the thermal protection layer will form the outermost layer at the thermally exposed area of the composite component and, in these instances the composite component will be completed after application of the thermal protection layer. However, in alternative instances, the particular surface emissivity or reflectivity of the thermal protection layer may be undesirable for a particular application. In these instances, the method of the present invention may include an additional step of applying a metallic or ceramic top layer to the thermal protection layer to provide a specific surface emissivity or reflectivity based on the requirements of a specific application of the composite component. In particular forms of the invention the top layer may be thermally sprayed to the thermal protection layer using twin-wire arc spraying, flame spraying or plasma spraying. It will therefore be appreciated that a top layer material having the desired thermal emission or reflection properties may be applied as an outermost layer to tailor the properties of the component surface, as desired. The top layer may, for example, provide a desired increase in heat rejection from the thermal exposure area. In some instances, the top layer may be applied in order to alter the aesthetic appearance of the surface, for example, to increase surface shine. The material of the top layer may be selected from any ceramic or metallic material suitable to achieve a desired aesthetic or functional effect. According to a particular form of the invention, the top layer is formed from an aluminium coating. Advantageously, an aluminium top layer facilitates reflection of radiant heat thereby improving thermal protection to the composite component. According to a particular form of the invention, the top layer is formed from the same metallic material as the bonding layer which, in some instances, may each comprise an aluminium coating.

In applying the bonding layer, the thermal protection layer and the optional top layer, it is desirable to reduce residual stresses between layers insofar as possible to promote adhesion between layers as well as improve overall mechanical properties of the composite structure. There are numerous causes of residual stresses between consecutive layers however one cause which may be regulated, or even prevented, is the existence of temperature differentials between layers. For this reason, some forms of the invention may involve the preheating of the composite component to a suitable temperature prior to the application of the bonding layer. Similarly, some spraying processes may involve maintaining the composite component temperature at a desirable level throughout the layering process to reduce thermal cycling/stress within the layers during application.

For the same reason as discussed above, at least some steps of the present invention may be performed by a robotic spray torch for precise control of thermal spray parameters such as standoff distances and spray angles. This level of control may, in turn, facilitate consistent coating application, uniformity of layer thickness and density which provides even thermal protection. Moreover, inherent residual stresses provided by temperature differentials between subsequent layers are advantageously reduced when the layers are applied in this precise manner. Other variables relating to thermal spraying which may be optimised in the present invention relate to the temperature at which the thermal sprays are applied. For example, compared to thermal spraying processes used to coat metallic components, a relatively low thermal spraying temperature is preferred when coating composite components to ensure the Tg of the polymer matrix is not exceeded. Spray parameters and procedures may therefore be customised for a particular application to ensure suitable layer properties are achieved while limiting thermal transfer to the composite substrate beneath the layer. By way of example, management of thermal spray torch energy, spray angle optimisation and external cooling of the part may, in some embodiments of the invention, be utilised.

It will be appreciated that the present invention may be applicable for use with a variety of composite systems including carbon fibre reinforced polymer (CFRP), carbon fibre reinforced plastic (CRP) or carbon fibre reinforced thermoplastic (CFRTP).

The above-discussed first aspect of the present invention advantageously utilises a ceramic material as the thermal protection layer to shield a composite component from radiant heat and, in particular, to reduce or prevent conduction of thermal energy through the thermal protection layer into the composite component. However, the Applicant has observed desirable protective properties in alternative materials also. Accordingly, a second aspect of the present invention provides a method of producing a composite component having a thermal protection layer including the steps of:
providing a composite component with a primary fibre material and with a primer layer of alternative fibre material overlying the primary fibre material at an area of the composite component intended for high thermal exposure, said area defining a thermal exposure area; and applying a metallic thermal protection layer to the thermal exposure area for reflecting external thermal energy.

In some forms of the second aspect, the metallic thermal protection layer can be applied directly to the primer layer similar to the metallic bonding layer being applied to the primer layer in the first aspect of the present invention. However, whereas the first aspect of the present invention provided the metallic bonding layer to facilitate adhesion between the primer layer and the ceramic thermal protection layer, the second aspect of the present invention advantageously utilises a metallic material as the thermal protection layer which can be applied directly to the primer layer without the need for a bonding interlayer therebetween. The metallic thermal protection layer advantageously provides high reflectivity capable of reflecting significant portions of radiant thermal energy. According to a particular embodiment of the third aspect of the present invention, the metallic thermal protection layer comprises an aluminium material. However, it is to be appreciated that a variety of metallic materials, for example molybdenum or tungsten, are also suitable for use as the metallic thermal protection layer.

In other forms of the second aspect of the present invention, there is included the step of, prior to application of the metallic thermal protection layer, applying a metallic bonding layer to the primer layer at the thermal exposure area to create a bonding surface at the thermal exposure area on which the metallic thermal protection layer is applied. The metallic thermal protection layer may be comprised of a different metallic material to the metallic material of the bonding layer. Depending on the type of materials used, the inclusion of a metallic bonding layer can improve adhesion of the metallic thermal protection layer. By way of example, the metallic bonding layer can comprise aluminium and the thermal protection layer can comprise molybdenum or tungsten. Advantageously, an aluminium metallic bonding layer generally provides greater adhesion with the primer layer than would be observed if molybdenum or tungsten coatings were applied to the primer layer directly. However, strong adhesion is obtained when molybdenum or tungsten coatings are applied to an aluminium coating. In this regard, the aluminium bonding layer provides a desirable interlayer between the thermal protection layer and the primer layer, improving overall adhesion. Moreover, molybdenum or tungsten coatings are typically applied at much greater temperatures than aluminium coatings. In this regard, applying an aluminium bonding layer prior to application of the thermal protection layer advantageously protects the composite component from the high-temperatures associated with a molybdenum or tungsten coating process. Of course, it is to be appreciated that a variety of alternative metallic materials are envisioned for use in a metallic thermal protection layer.

In embodiments of the second aspect of the invention where a metallic bonding layer is provided between the primer layer and the thermal protection layer, it will thus be appreciated that the only distinction from the first aspect of the invention is the use of a metallic thermal protection layer, as opposed to the ceramic thermal protection layer associated with the first aspect of the present invention. In this instance, the invention may relate to a method of producing a composite component having a thermal protection layer including the steps of: providing a composite component with a primary fibre material and with a primer layer of alternative fibre material overlying the primary fibre material at an area of the composite component intended for high thermal exposure, said area defining a thermal exposure area; applying a metallic bonding layer to the primer layer of the thermal exposure area to create a bonding surface at the thermal exposure area; and applying a metallic thermal protection layer to the bonding surface for insulating the thermal exposure area and/or for reflecting external thermal energy, the metallic thermal protection layer comprising an alternative metallic material to the metallic bonding layer and the metallic thermal protection layer having a higher melting point than the metallic bonding layer.

It will be appreciated that specific aspects of the primer layer discussed in the foregoing with reference to the first aspect of the invention are equally applicable for use in the second aspect of the present invention. Similarly, the above noted features of the metallic bonding layer in relation to the first aspect of the invention are generally applicable to the metallic thermal protection layer according to the second aspect of the invention. For example, the above noted materials and application techniques associated with the metallic bonding layer equally relevant to the metallic thermal protection layer. The thickness of the metallic thermal protection layer in the second aspect of the invention may, in some instances, be similar to the thickness of the metallic bonding layer in the first aspect of the invention. Alternatively, in some applications, it may be desirable to apply a thicker metallic thermal protection layer than would be necessary as a metallic bonding layer when performing the first aspect of the invention. For example, the thickness of the metallic thermal protection layer may range from 40 to 300 microns and, preferably, between 60 to 111 microns.

It will thus be appreciated that the first and second aspects of the present invention each provide a composite component having a layer of thermal protection and, advantageously, each utilises a primer layer overlying the primary fibre material of the composite component to improve adhesion between the composite component and the respective thermal protection layers.

According to a third aspect of the present invention there is provided a method of producing a composite component having a thermal protection coating including the steps of:
moulding a composite component with a primary fibre material and with a primer layer of alternative fibre material overlying the primary fibre material at an area of the composite component intended for high thermal exposure, said area defining a thermal exposure area;
preparing the surface of the thermal exposure area with a surface treatment to expose at least a portion of the primer layer;
applying a metallic bonding coat to the primer layer to create a bonding surface at the thermal exposure area; and
applying a ceramic thermal protection coat to the bonding surface for insulating the thermal exposure area and/or for reflecting external thermal energy, the thermal protection coat having a higher melting point than the metallic bonding coat.

The third aspect of the present invention advantageously involves moulding the composite component with the integrated primer layer and involves the step of preparing the surface of the thermal exposure area with a surface treatment to expose a portion of the primer layer in order to improve adhesion between the primer layer and the subsequent metallic bonding coat.

The first, second and third aspects of the present invention may be used, in particular, to provide a composite wheel, preferably a carbon fibre wheel having a thermal protection layer. As noted in the foregoing, automobile wheels are typically exposed to significant thermal energy emitted from the brake and rotor assembly during the vehicle braking process. During hot weather or during high performance driving conditions, automobile wheels can also be exposed to large amounts of thermal energy transmitted through the tire and into the rim, spokes or hub of the wheel.

The present invention may therefore provide, in a fourth aspect, a composite component having a thermal exposure area including: a layer of primary fibre material; a primer layer overlying the primary fibre material at the thermal exposure area, the primer layer being formed from alternative fibre material to the primary fibre material; and a thermal protection layer overlying the primer layer wherein the thermal protection layer insulates the thermal exposure area and/or for reflects external thermal energy.

In a particular embodiment of the fourth aspect of the present invention, the thermal protection layer is metallic. Advantageously the use of metallic materials provides high reflectivity thereby tending to reflect radiant heat that is emitted from a vehicle brake assembly away from the thermal exposure area of the wheel. In a particular form of the invention, the thermal protection layer is formed from an aluminium material.

According to an alternative embodiment of the fourth aspect of the invention the thermal protection layer is ceramic. Advantageously, a ceramic thermal protection layer tends to significantly reduce thermal conductivity such that the composite component is not only shielded from radiant heat but also protected against thermal energy conducting through the thermal protection layer into the primer layer and the primary fibre material. To facilitate adhesion between said ceramic thermal protection layer, a particular form of the fourth aspect of the invention includes a metallic bonding layer between the primer layer and the ceramic thermal protection layer. Advantageously, the provision of a metallic bonding layer provides an interlayer between the fibrous primer layer and the ceramic thermal protection layer improving overall adhesion within the various layers on the wheel.

The composite component can also include a metallic bonding layer between the primer layer and the thermal protection layer in instances where the thermal protection layer is not ceramic. For example, according to a particular form of the invention a metallic bonding layer is applied prior to a metallic thermal protection layer. According to a particular example, an aluminium bonding layer is applied prior to application of an alternative metallic material, for example molybdenum or tungsten. In this regard, the aluminium bonding layer offers greater adhesion to the primer layer than molybdenum or tungsten therefore advantageously improves adhesion by functioning as an interlayer between the thermal protection layer and the primer layer. Moreover, molybdenum or tungsten coatings are typically applied at much greater temperatures than aluminium coatings. In this regard, applying an aluminium bonding layer prior to application of the thermal protection layer advantageously protects the composite component from the high-temperatures associated with a molybdenum or tungsten coating process.

The composite component may comprise a composite wheel, preferably a carbon fibre wheel. The composite wheel can include a hub, a rim surrounding the hub and a plurality of spokes extending between the hub and the rim. It will be appreciated that the spokes of the composite wheel will include an outwardly facing surface which, in use, faces outwardly from a vehicle wheel well and an inwardly facing surface which, in use, faces inwardly into a vehicle wheel well. It will also be appreciated that the inwardly facing surface of the wheel spokes will, in use, generally be adjacent to or face a brake rotor. According to a particular embodiment of the invention, the thermal exposure area includes at least a portion of the inwardly facing surfaces. In this manner the present invention may be used to provide a wheel with a thermally protected area on the inside of the wheel spokes which are typically exposed to relatively high thermal energy emitted from the wheel rotor as a result of the vehicle braking process. The thermal exposure area may also include portions of the rim or the hub and may, for example, include an annular strip along the inside surface of the rim. The location of the thermally protected areas of the rim or hub may vary to suit the particular location of the brake assembly in a particular vehicle.

It should be appreciated that the composite component of the fourth aspect of the present invention can be prepared or manufactured by the method of the first, second or third aspects of the present invention. Accordingly, all the features discussed in relation to the first aspect of the present invention are equally applicable to the fourth aspect of the present invention.

Similarly, it will be appreciated that the features discussed above with respect to the first aspect of the invention equally applicable to the second and third aspects of the present invention.

Finally, in a further aspect of the invention there is provides a composite component having a thermal exposure area including:
 a layer of primary fibre material;
 a primer layer overlying the primary fibre material at the thermal exposure area, the primer layer being formed from alternative fibre material to the primary fibre material;
 a metallic bonding layer overlying the primer layer; and
 a ceramic thermal protection layer overlying the metallic bonding layer
wherein the thermal protection layer has a higher melting point than the metallic bonding layer and wherein the thermal protection layer insulates the thermal exposure area and/or for reflects external thermal energy.

Again, it should be appreciated that the composite component of this further aspect of the present invention can be prepared or manufactured by the method of the first, second or third aspects of the present invention. Accordingly, all the features discussed in relation to these aspects of the present invention are equally applicable to this further aspect of the present invention.

BRIEF DESCRIPTION OF DRAWINGS

The present invention will now be described with reference to the figures of the accompanying drawings which illustrate particular preferred embodiments of the present invention wherein.

DETAILED DESCRIPTION

Figure 1:
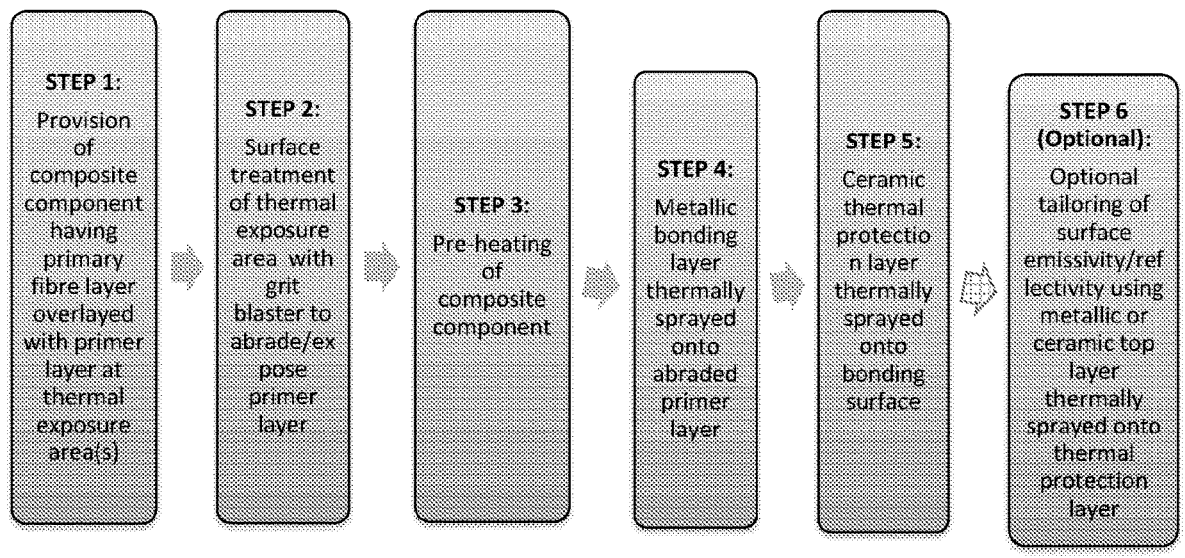
FIG. 1 is a process diagram representing a method according to an embodiment of the present invention.

Referring firstly to FIG. 1, the present invention is represented in a process diagram demonstrating the consecutive steps undertaken in performing the method according to the present invention. It will thus be appreciated that the steps of the present invention are generally linear with the exception of the optional top coat which may or may not be applied depending on intended specific application of the composite component. As illustrated in FIG. 1, the steps associated with a preferred embodiment of the present invention as follows:

Step 1 comprises the provision of a composite component having a primary fibre layer overlayed with a primer layer at a thermal exposure area. For example, conventional fibre composite moulding techniques may be used in the provision of the composite component which can be formed, for example, from carbon fibre.

Step 2 comprises applying a surface treatment to the primer layer to erode or abrade the resin at the primer layer thereby exposing a portion of the primer layer to facilitate subsequent adhesion with the bonding layer. The surface treatment preferably comprises grit blasting. In particular, the surface treatment preferably comprises grit blasting with alumina grit.

Step 3 comprises the composite component being preheated to a suitable temperature and maintained in a specified range to reduce thermal cycling or thermal stresses when heated layers are subsequently applied. By way of example, the composite component may be preheated to 80°

Step 4 comprises the application of a metallic bonding layer onto the abraded primer layer by thermal spraying. The thermal spraying temperature is desirably low to ensure the composite component is not heated beyond the thermal resistance (Tg) of the polymer matrix used in the composite component. The thermal spraying technique used may, for example, comprise twin-wire arc, flame or plasma spraying.

Step 5 comprises the application of a ceramic thermal protection layer onto the bonding layer by thermal spraying, for example plasma spraying. The thermal protection layer reflects thermal energy and desirably insulates the composite component at the thermal exposure area.

Step 6 comprises an optional step of applying a metallic or ceramic top layer onto the thermal protection layer to tailor the surface properties if, for example, particular emissivity/reflectivity properties are desired.

FIGS. 2 to 5 illustrate a side view of a process of producing a thermally protected composite component according to the above discussed first and third aspects of the present invention.

Figure 2:
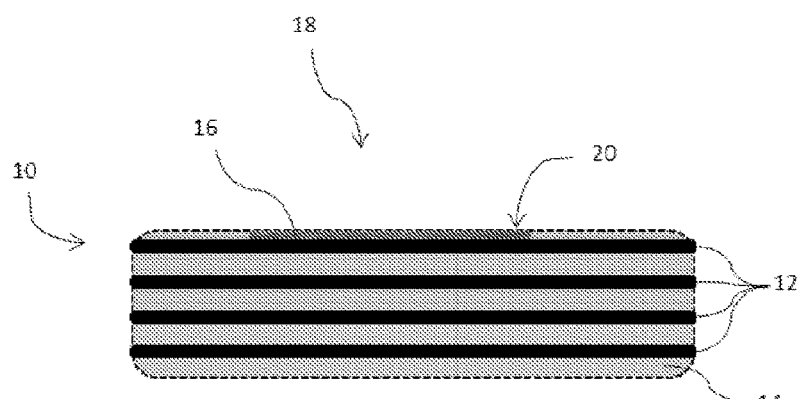
FIG. 2 illustrates a side view of a composite of a composite component according to an embodiment of the invention including a ceramic primer layer

Turning to FIG. 2, a composite component 10 is illustrated comprising primary carbon fibre layers 12 and impregnated with a polymer matrix 14. A woven primer mat 16 formed of ceramic glass fibres overlies a portion of a primary fibre layer 12 at a thermal exposure area 18 of the composite component 10 intended for exposure to high thermal energy. It will be appreciated, therefore, that the illustrated composite in FIG. 2 provides a composite component and thereby corresponds with method Step 1 as illustrated in FIG. 1 and discussed above.

Figure 3:
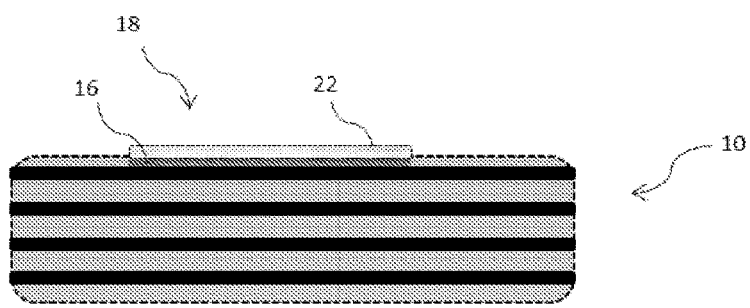
FIG. 3 illustrates the composite component of FIG. 2 having been applied with a bonding coat onto the primer layer.

To produce the composite components 10 illustrated in FIG. 3, the composite component 10 illustrated in FIG. 2 undergoes the process steps, as indicated in Steps 2, 3 and 4 of FIG. 1 and as discussed in the foregoing.

Firstly, as indicated in the method Step 2 in FIG. 1, thermal exposure area 18 undergoes a surface treatment in which a grit blaster (not shown) is applied to the thermal exposure area 18 to abrade the outer surface of the polymer resin 14 which overlies and impregnates the primer mat 16, thereby exposing at least a portion of primer mat 16. In the preferred embodiment, the surface treatment comprises the application of medium or fine alumina grit in the range of #90 to #46 mesh which is applied at a pressure of 20 to 40 psi and accelerated in an air or water stream of a suitable grit blaster device until a surface roughness of 4 to 7 micrometres RA is obtained at the outer surface 20 of the primer mat 16.

Secondly, as indicated in method Step 3 of FIG. 1, the composite component 10 is pre-heated to reduce the temperature differential between the composite component 10 and a bonding layer comprising a bonding coat 22 applied to the primer mat 16 in the next stage of the process.

Thirdly, and turning now to FIG. 3, a metallic bonding layer comprising a bonding coat 22 is thermally sprayed onto the abraded outer surface 20 of the primer mat 16 using a plasma sprayer and to a thickness of between 64 to 111 microns. As discussed above, the primer mat 16 thereby forms an interlayer between the underlying primary fibre layer 12 and the overlying bonding coat 22. It will be appreciated that the illustration in FIG. 3 corresponds with the end of method Step 4 in the process diagram of FIG. 1. As indicated in Step 5 of FIG. 1 and illustrated in FIG. 4, a ceramic thermal protection layer comprising a ceramic thermal protection coat 24 is then applied to the bonding coat 22 using plasma spraying. In the preferred embodiment the thickness of the thermal protection coat 24 is between 100 to 150 microns.

Referring again to FIG. 1, in applications of the present invention where the thermal protection coat 24 is sufficient to be the final coating of the thermal exposure area 18, the method of the present invention may be completed after application of the thermal protection coat.

In alternative applications where the emissivity or reflectivity properties of thermal protection coat 24 are unsuitable as the final coating on the thermal exposure area 18, the process may move from the fifth process step to the optional method Step 6 in which a metallic or ceramic top coat 26 is thermally sprayed onto the thermal protection coat 24. Top coat 26 may be applied, for example, using twin-wire arc, flame, or plasma spraying. In this regard, the emissivity and/or reflectivity of the thermal exposure area 18 may be tailored to suit a particular application with selection of an appropriate top coat material.

Figure 5:
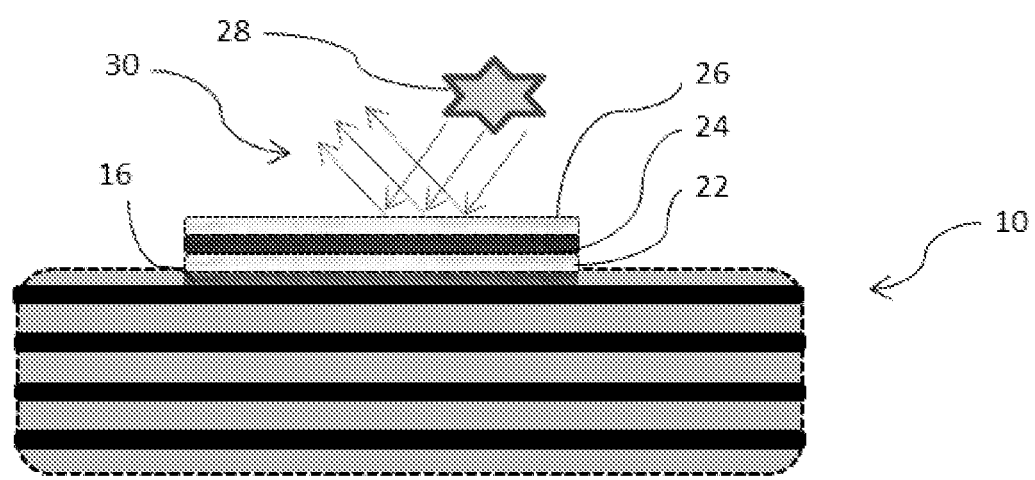
FIG. 5 illustrates the composite component of FIG. 4 having been applied with an optional top coat onto the thermal protection coat and exposed to a source of high thermal energy.

As illustrated in FIG. 5, after the application of the top coat 26 the composite component 10 is therefore ready for exposure to a thermal energy source 28. Owing to the reflective and insulative properties of the thermal protection coating 24 and the top coating 26, the polymer matrix 14 proximate to the thermal exposure area 18 is protected from thermal energy 30 emitted from the thermal energy source 28.

Figure 6:
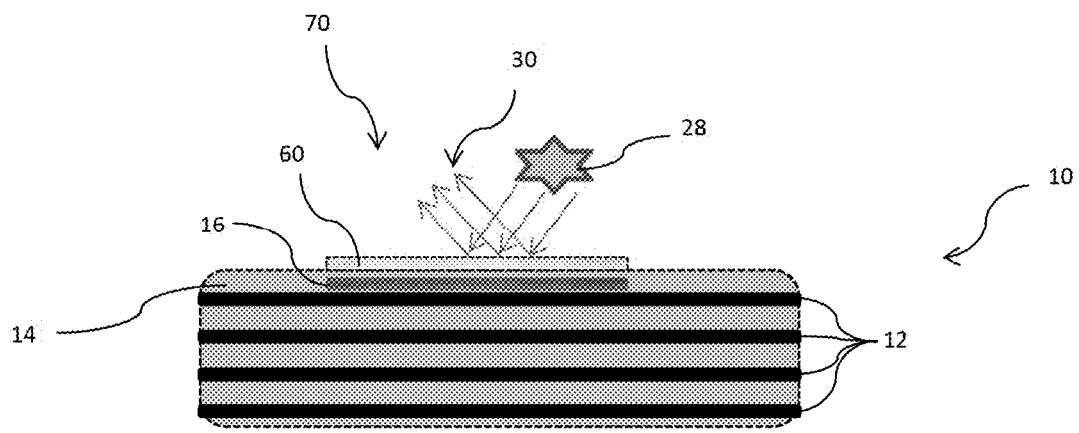
FIG. 6 illustrates a side view of a composite component according to an alternative embodiment of the present invention.

FIG. 6 illustrates a second aspect of the present invention in which a composite component 10 is provided in accordance with above-discussed Steps 1 to 3 i.e. a composite component 10 having carbon fibre layers 12 and an overlying glass primer layer 16 at a thermal exposure area 70. Carbon layers 12 and glass layer 16 are impregnated with a polymer matrix 14. In the same manner as discussed above with respect to the first and third aspects of the present invention, primer layer 16 is then grit blasted to abrade the surface of the primer layer. The composite component 10 is subsequently pre-heated to approximately 80° before a metallic thermal protection layer 60 is thermally sprayed onto the primer layer 16 to a thickness of between 40 to 300 microns and, preferably between 64 to 111 microns. The metallic thermal protection layer 60 may comprise a variety of metallic materials however according to a particular embodiment of the invention, the metallic thermal protection layer 60 is comprises of an aluminium material. The glass fibres of primer layer 16 advantageously promote adhesion with the aluminium material of the thermal protection layer 60 which operates to reflect radiant thermal energy 30 that is emitted from a thermal energy source 28 (for example a vehicle brake assembly) away from composite component 10.

Figure 4:
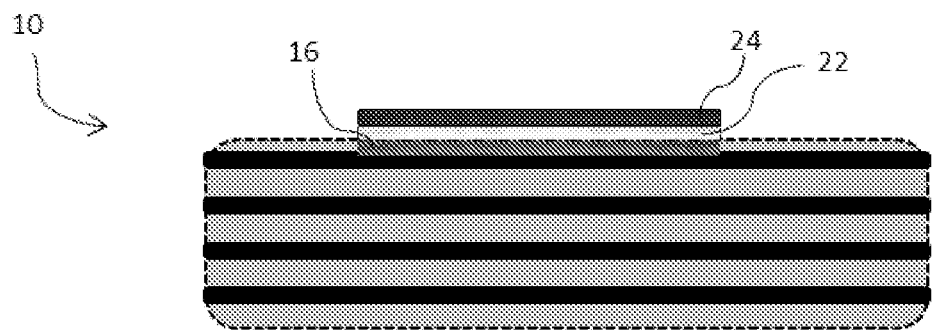
FIG. 4 illustrates the composite component of FIG. 3 having been applied with a thermal protection coat onto the bonding coat.

In this manner, the second aspect of the present invention advantageously utilises a primer layer 16 to improve adhesion between aluminium thermal protection layer 60 and composite component 10. It will be appreciated that the thermally protected composite components 10 illustrated in FIGS. 5 and 6 each utilise primer layer 16 in this way. It will also be appreciated that FIGS. 3 and 6 are generally equated insofar as each illustrates a metallic layer applied to primer layer 16. As discussed in the foregoing, in some applications it will be sufficient (and desirable) for the thermal protection layer to constitute a metallic layer which tends to provide high reflectivity, reducing the amount of radiant heat absorbed into the composite component. In other applications, it may be desirable for the thermal protection layer to have a lower level of thermal conductivity in which case a thinner metallic layer applied (i.e. 64-111 microns) which therefore constitutes a metallic bonding layer and a subsequent ceramic layer 24 is applied (as illustrated in FIG. 4) which, in this instance, therefore constitutes the thermal protection layer.

Figure 7:
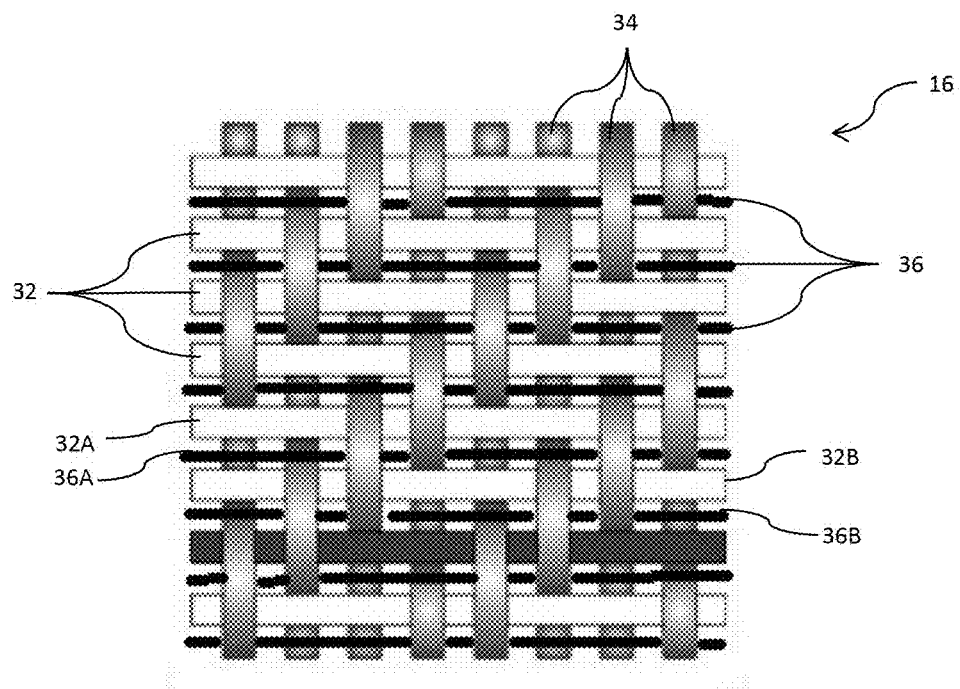
FIG. 7 illustrates a primer layer for use in the method according to the present invention.

FIG. 7 illustrates a closer perspective of primer mat 16 which comprises a plurality of longitudinal glass fibre warp yarns 34 woven with a plurality of traverse glass fibre weft yarns 32. Glass fibre primer mat 16 includes a plurality of metallic strands comprising metallic wires 36 woven into primer mat 16 between adjacent weft yarns 32. As illustrated in FIG. 7, metallic wires 36 follow the weave pattern of one of the adjacent weft yarns 32. By way of example, weft yarn 32A and metallic wire 36A have corresponding 'under/over' wave patterns through the plurality of warp yarns 34. Similarly, the weave pattern of weft yarn 32B corresponds with the weave pattern of adjacent metallic wire 36B. The provision of metallic wires 36 in primer layer 16 advantageously facilitates adhesion between the primer layer and the metallic bonding layer thereby improving overall adherence between the thermal protection layer and the composite component. By way of example, metallic wires 36 may be formed from at least one of copper, aluminium, titanium, steel or alloys thereof.

Whilst the primer layer exemplified in FIG. 7 comprises glass fibres, as noted in the foregoing, the primer layer could comprise a variety of alternative materials. For example, a composite component formed from carbon or aramid fibre could be provided with a primer layer of glass fibre (without metallic strands). Alternatively, a composite component formed from carbon fibre could be provided with a primer layer comprising a mix of carbon fibre and metallic strand. Similarly, composite component formed from aramid fibre could be provided with a primer layer of comprising a mix of aramid fibre and metallic strand. It will therefore be appreciated that a variety of combinations of primary fibre material and primer layer material are conceived, each falling within the scope of the present invention.

In a preferred embodiment of the present invention, the composite component 10 comprises a carbon fibre wheel, for example, as taught in International Patent Applications PCT/AU2012/000598, PCT/AU2014/000324, PCT/AU2013/000646, PCT/AU2013/000647, PCT/AU2013/000648 and PCT/AU2009/001120, the contents of which should be understood to be incorporated herein by reference.

Figure 8:
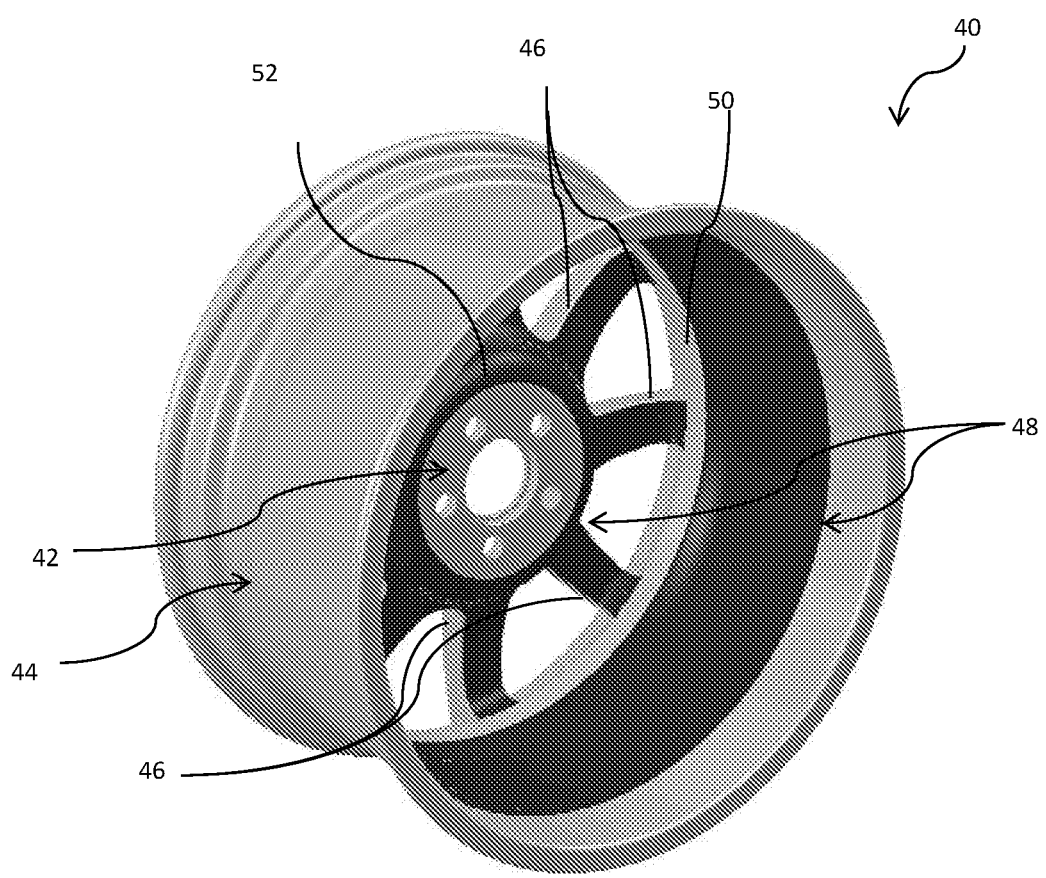
FIG. 8 is a perspective view of a composite wheel having a thermal protection layer applied according to the present invention.

An exemplary example of one such carbon fibre wheel is illustrated in FIG. 8 in which the composite component comprises a carbon fibre wheel 40 including a hub 42, a rim 44 and a plurality of spokes 46 extending between the hub 42 and the rim 44. FIG. 8 illustrates the location of the thermal exposure area 48 in darker shade. As will be appreciated with reference to the foregoing, the metallic bonding layer and the thermal protection layer are therefore also located at the position of the darker shade denoting the thermal exposure area 48. In this manner, the darker shaded areas illustrated in FIG. 8 have a degree of thermal protection against the radiant and convective thermal energy emitted from the brake assembly which, during use, is located inside the rim 44 of wheel 40.

As illustrated in FIG. 8, the thermal exposure area includes sections of the inside of wheel 40 which, when installed on a vehicle, are generally adjacent to the brake assembly of the vehicle. In particular, thermal exposure area 48 includes an inwardly facing surface (i.e. facing inwardly, toward the brake assembly) on each of the spokes 46 and an annular portion on an inwardly facing surface of the rim 44. The thermal exposure area 48 also includes a shoulder portion 52 of the hub 42. It will be appreciated that the central un-shaded flat portion of hub 42 will, in use, abut the rotor mounting face and will therefore not be exposed to the radiant heat applied to the internal faces of the spokes 46 and to the shoulder of the hub 42. At the intersection of the spokes 46 and the rim 44 there is an un-shaded annular portion 50 where wheel weights (not shown) can be fitted.

It is generally desirable for thermal exposure area 48 (and the associated thermal protection layers) to be located on the inner surface of spokes 46 and on the shoulder of hub 42, irrespective of the particular brake assembly to which wheel 40 is fitted. In contrast, the thickness of the thermal exposure area 48 on the inside of the rim may vary depending on the size of the rotor and brake assembly to which wheel 40 is mounted. In the illustrated embodiment, the thermal exposure area comprises approximately two thirds of the inside surface of rim 44. In alternative embodiments, in which wheel 40 is intended for use with a smaller rotor/brake assembly, the thermal exposure area may comprise a reduced portion of the internal rim surface. In this instance, the total area of the thermal protection layers can be correspondingly reduced thereby reducing the costs associated with manufacturing the thermally protected composite wheel.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

Finally, it is to be understood that the invention described herein is susceptible to variations, modifications and/or additions other than those specifically described and it is to be understood that the invention includes all such variations, modifications and/or additions which fall within the spirit and scope of the present disclosure.

EXAMPLES

As noted in the foregoing, the Applicant has investigated the adhesion improvements provided by the present invention using testing methods conducted in accordance with ASTM D4541: 'Standard Test Method for Pull-Off Strength of Coatings Using Portable Adhesion Testers'. The testing conducted demonstrated improved adhesion between the composite component of primary fibre material and a thermal protection layer applied to the composite component when utilising an intermediate primer layer formed from alternative fibre material to that of the primary (i.e. base) fibre material.

Adhesion testing conducted in accordance with ASTM D4541 involved adhering a circular metal dolly to a cleaned surface of a testing sample of composite material which has been coated according to the above-described thermal protection process. A suitable adhesive such as a two-part epoxy is used to adhere the circular base of the dolly to the outermost surface of the testing sample. The adhesive is selected to provide greater adhesion between the base of the dolly and the material surface than the expected adhesion between the layers of the multi-layered composite material such that, when a pulling load is applied to the dolly, delamination will occur between the thermal protection coatings and the composite surface and not between the dolly and material surface. Prior to adhesive curing, excess adhesive around the base of the dolly is removed. Once the adhesive is cured, a cutting tool is used to apply an annular cut around the base of the dolly to isolate the circular portion of material beneath the base of the dolly. A pneumatic actuator is connected to the dolly to apply a pulling force to the dolly while the testing sample is held stationary. The pneumatic actuator is connected to a testing device which records the maximum pressure applied to the dolly. Pressure is increased until delamination occurs between the composite component and the thermal protection coating(s) which have been applied to the composite component.

Table 1 below provides the results from three separate tests conducted to compare adhesion levels with or without the use of a primer layer. The composition of the primer layer was a 110 g/m$^2$ plain weave glass mat. In particular, E-Glass fibres of continuous filament having 7 micron diameter and a yarn of 22 (22 grams per 1000 m). E-Glass fibres typically comprise 52%-56% silicon dioxide, 16%-25% calcium oxide, 12%-16% aluminium oxide, 8%-13% boron oxide, 0%-1% sodium & potassium oxide and 0% to 6% magnesium oxide. In all testing, a grit-blasting surface treatment was applied to the surface of either the primer layer or, where a primer layer was not used, the surface of the composite component, to expose a portion of the primer layer material or the composite component primary fibre material respectively.

Test 1 recorded adhesion levels where an aluminium bonding layer and a ceramic thermal protection layer were applied to a composite component with or without the use of an intermediary primer layer. As illustrated in Table 1, adhesion was observed to increase by an average of 25.45% where a glass primer layer was used, as compared to applying the metallic bonding layer directly to the composite component.

Test 2 recorded adhesion levels where an aluminium bonding layer, a ceramic thermal protection layer and an aluminium top coat were applied to a composite component with and without the use of an intermediary primer layer. As illustrated in Table 1, adhesion was observed to increase by an average of 21.08% when a glass primer layer was used, as compared to applying the metallic bonding layer directly to the composite component.

Test recorded adhesion levels where an aluminium thermal protection layer was applied to a composite component with and without the use of an intermediary primer layer. As illustrated in table 1, adhesion was observed to increase by an average of 228.32% when a primer layer was used, as compared to applying the aluminium thermal protection layer directly to the composite component.

TABLE 1

| Resin Comparison (Tab Data) | Average | Min | Max | % Increase |
|---|---|---|---|---|
| No Glass Al—TBC | 3.30 | 3.24 | 3.36 | 125.45 |
| Glass Al—TBC | 4.14 | 3.99 | 4.29 | |
| No Glass Al—TBC—Al | 2.78 | 2.44 | 3.11 | 121.08 |
| Glass Al—TBC—Al | 3.36 | 2.99 | 3.73 | |
| No Glass Al | 2.13 | 1.79 | 2.43 | 328.32 |
| Glass Al | 6.99 | 6.88 | 7.09 | |

Glass/NoGlass = Primer layer or No Primer layer
Al—TBC—Al = Bond Layer, Cermaic with Al top coat
Al—TBC = Bond Layer and Ceramic
Al = Alumnium only As will be appreciated with reference to the test results above, the Applicant has achieved significantly improved levels of adhesion where an intermediary primer layer is provided between the composite component and the subsequently applied coating(s).

It will therefore be appreciated that all aspects of the present invention provide a significant improvement in adhesion strength between a composite component and a thermal protection layer thereby providing an advantage over existing processes which are cumbersome and/or incapable of achieving sufficient adhesion strength, leading to increased risk of delamination.

The claims defining the invention are as follows:

1. A composite component having a thermal exposure area, the composite component including:
   a. a layer of primary fibre material;
   b. a primer layer impregnated into the composite component and overlying the primary fibre material at the thermal exposure area, the primer layer being formed from alternative fibre material to the primary fibre material; and
   c. a thermal protection layer overlying the primer layer, wherein the thermal protection layer insulates the thermal exposure area and/or reflects external thermal energy.

2. The composite component according to claim 1, further comprising a metallic bonding layer between the primer layer and the thermal protection layer.

3. The composite component according to claim 2, wherein the thermal protection layer comprising a metallic material other than the metallic material of the metallic bonding layer.

4. The composite component according to claim 2, wherein the metallic bonding layer comprises an aluminum material.

5. The composite component according to claim 2, wherein the primer layer includes metallic strands or particles configured to facilitate adhesion between the primer layer and the metallic bonding layer.

6. The composite component according to claim 1, wherein the thermal protection layer is ceramic.

7. The composite component according to claim 1, further comprising a composite wheel including a hub, a rim, and a plurality of spokes extending between the hub and the rim.

8. The composite component according to claim 7, wherein the thermal exposure area is located on the plurality of spokes and the plurality of spokes each including an inwardly facing surface which, in use, faces a vehicle rotor and wherein the thermal exposure area includes at least a portion of the inwardly facing surfaces.

9. The composite component according to claim 1, further comprising a metallic top layer overlying the thermal protection layer.

10. The composite component according to claim 9, wherein the metallic top layer comprises an aluminum material.

11. The composite component according to claim 1, wherein the primer layer comprises a ceramic fibre material.

12. The composite component according to claim 1, wherein the primer layer comprises a fibre material formed of woven fibres.

13. The composite component according to claim 1, wherein the primer layer impregnated into the composite component further comprises impregnating a resin of the composite component with the primer layer.

14. A method of producing a composite component having a thermal protection layer, the method comprising:
   providing a composite component with a layer of primary fibre material and with a primer layer impregnated into the composite component and overlying the primary fibre material at a thermal exposure area of the composite component, wherein the primer layer is formed from alternative fibre material to the primary fibre material;
   applying a metallic bonding layer to the primer layer of the thermal exposure area to create a bonding surface at the thermal exposure area; and
   applying a ceramic thermal protection layer to the bonding surface for insulating the thermal exposure area and/or for reflecting external thermal energy, the thermal protection layer having a higher melting point than the metallic bonding layer, and the ceramic thermal protection layer overlying the primer layer.

15. The method according to claim 14, further comprising preparing a surface of the thermal exposure area with a surface treatment to expose at least a portion of the primer layer, prior to application of the metallic bonding layer.

16. The method according to claim 15, wherein the surface treatment includes grit blasting the thermal exposure area.

17. The method according to claim 16, wherein the surface treatment includes grit blasting the thermal exposure area with alumina grit.

18. The method according to claim 14, wherein the primer layer of the alternative fibre material comprises a ceramic fibre material.

19. The method according to claim 14, wherein the primer layer comprises a fibre material formed of woven fibres or a fibre material formed of randomly oriented fibres.

20. The method according to claim 14, wherein the metallic bonding layer is thermally sprayed to the primer layer using twin-wire arc spraying, flame spraying, or plasma spraying.

21. The method according to claim 14, wherein the ceramic thermal protection layer is thermally sprayed to the metallic bonding layer using plasma spraying.

22. The method according to claim 14, further comprising applying a metallic or ceramic top layer to the ceramic thermal protection layer to provide a specific surface emissivity or reflectivity based on requirements of a specific application of the composite component.

23. A method of producing a composite component having a thermal protection layer, the method comprising:
providing a composite component with a primary fibre material and with a primer layer impregnated into the composite component and overlying the primary fibre material at a thermal exposure area of the composite component, the primary layer being formed from alternate fibre material to the primary fibre material; and
applying a metallic thermal protection layer to the thermal exposure area for insulating the thermal exposure are and/or for reflecting external thermal energy, the metallic protection layer overlying the primer layer.

24. The method according to claim 23, further comprising, prior to application of the metallic thermal protection layer, applying a metallic bonding layer to the primer layer at the thermal exposure area to create a bonding surface at the thermal exposure area on which the metallic thermal protection layer is applied.

25. The method according to claim 24, wherein the metallic bonding layer comprises an aluminum material.

26. The method according to claim 24 wherein the metallic thermal protection layer comprises molybdenum or tungsten.

* * * * *